US009547985B2

(12) United States Patent
Tuukkanen

(10) Patent No.: US 9,547,985 B2
(45) Date of Patent: Jan. 17, 2017

(54) METHOD AND APPARATUS FOR PROVIDING ACCESS TO AUTONOMOUS VEHICLES BASED ON USER CONTEXT

(71) Applicant: HERE Global B.V., Veldhoven (DE)

(72) Inventor: Marko Tapio Tuukkanen, Schlenzer (DE)

(73) Assignee: HERE Global B.V., Veldhoven (NL)

(*) Notice: Subject to any disclaimer, the term of this patent is extended or adjusted under 35 U.S.C. 154(b) by 0 days.

(21) Appl. No.: 14/533,691

(22) Filed: Nov. 5, 2014

(65) Prior Publication Data
US 2016/0125735 A1    May 5, 2016

(51) Int. Cl.
G01C 22/00    (2006.01)
G05D 1/00    (2006.01)
(Continued)

(52) U.S. Cl.
CPC .............. G08G 1/09 (2013.01); G08G 1/0962 (2013.01); H04L 67/12 (2013.01)

(58) Field of Classification Search
CPC ........ G08G 5/0069; G08G 1/202; G08G 1/20; G08G 1/01; G08G 1/123; G08G 1/207; G08G 5/025; G08G 5/0082; G08G 1/167; G08G 5/0034; G08G 1/054; G08G 1/07; G08G 1/09; G08G 1/161; G08G 1/162; H04L 12/24; H04L 12/66; H04L 29/06; H04L 29/08; H04L 9/00; H04L 12/40; H04L 67/12; H04L 67/04; H04L 67/10; H04L 67/18; H04L 51/14; H04L 51/20; H04L 51/32; H04L 67/025; G05D 1/0231; G05D 1/0011; G05D 1/0246; G05D 1/0291; G05D 1/0027; G05D 1/0255; G05D 1/0289; G01C 21/005; G01C 21/10; G01C 11/04; G01C 21/34; G01C 21/26; G01C 21/3685
(Continued)

(56) References Cited

U.S. PATENT DOCUMENTS 6,049,745 A * 4/2000 Douglas .............. G05D 1/0261
                                                             180/168
6,166,656 A    12/2000 Okada et al.
(Continued)

FOREIGN PATENT DOCUMENTS

FR       2923640 A1      5/2009
WO    2014052329 A1      4/2014

OTHER PUBLICATIONS

International Preliminary Report on Patentability for International Application No. PCT/EP2015/067201, mailed Oct. 19, 2015, 3 Pages.
(Continued)

Primary Examiner — Calvin Cheung
Assistant Examiner — Luis A Martinez Borrero
(74) Attorney, Agent, or Firm — Ditthavong & Steiner, P.C.

(57) ABSTRACT

An approach is provided for granting access to an autonomous vehicle based on validation of a request, and configuring an autonomous vehicle to transport a user and/or items to at least one destination. The approach involves receiving a transport request for a transport of at least one user, at least one item, or a combination thereof to at least one destination. The approach also involves determining profile information associated with the at least one user, the at least one item, or a combination thereof, wherein the profile information specifies at least one role associated with the at least one user, the at least one item, or a combination thereof. The approach further involves causing, at least in part, a valida-
(Continued)

tion of the request based, at least in part, on a comparison of the at least one destination to one or more approved destinations associated with the at least one role. The approach also involves causing, at least in part, a granting of an access to one or more autonomous vehicles for the transport of the at least one user, the at least one item, or a combination thereof to the at least one destination based, at least in part, on the validation.

15 Claims, 15 Drawing Sheets

(51) Int. Cl.
*G08G 1/09* (2006.01)
*G08G 1/0962* (2006.01)
*H04L 29/08* (2006.01)

(58) Field of Classification Search
USPC ......... 701/117, 23, 2, 19, 20, 301, 300, 119, 701/517, 93, 96, 22, 27, 3, 36, 408, 465, 701/532, 5
See application file for complete search history.

(56) References Cited

U.S. PATENT DOCUMENTS

| | | | | |
|---|---|---|---|---|
| 6,453,298 B2 * | 9/2002 | Murakami | ........... | G06Q 10/047 701/117 |
| 6,507,777 B1 * | 1/2003 | Pinlam | ........... | G05D 1/0225 340/988 |
| 7,499,804 B2 * | 3/2009 | Svendsen | ........... | G05D 1/027 340/426.11 |
| 8,145,368 B2 * | 3/2012 | Won | ........... | G08G 1/01 701/119 |
| 8,948,935 B1 * | 2/2015 | Peeters | ........... | B64C 39/024 701/3 |
| 9,125,987 B2 * | 9/2015 | Levien | ........... | G05D 1/00 |
| 9,158,304 B2 * | 10/2015 | Fleck | ........... | G05D 1/0011 |
| 9,177,476 B2 * | 11/2015 | Breed | ........... | G01C 21/3611 |
| 9,229,623 B1 * | 1/2016 | Penilla | ........... | G06F 3/04842 |
| 9,278,689 B1 * | 3/2016 | Delp | ........... | G08G 1/0965 |
| 9,429,943 B2 * | 8/2016 | Wilson | ........... | G05D 1/0088 |
| 2002/0026266 A1 | 2/2002 | Montague | | |
| 2002/0102961 A1 * | 8/2002 | Gibbons | ........... | G08G 1/0965 455/404.2 |
| 2003/0187571 A1 * | 10/2003 | Impson | ........... | G07C 5/008 701/117 |
| 2006/0089766 A1 * | 4/2006 | Allard | ........... | G05D 1/0061 701/23 |
| 2009/0152833 A1 * | 6/2009 | Johnson | ........... | B60Q 1/2611 280/504 |
| 2011/0054836 A1 * | 3/2011 | Foxlin | ........... | G01C 21/165 702/150 |
| 2011/0130636 A1 * | 6/2011 | Daniel | ........... | G08B 25/016 600/301 |
| 2011/0264360 A1 * | 10/2011 | Boss | ........... | B61L 27/04 701/117 |
| 2012/0083960 A1 * | 4/2012 | Zhu | ........... | G05D 1/0214 701/23 |
| 2012/0330540 A1 * | 12/2012 | Ozaki | ........... | G06Q 10/047 701/117 |
| 2013/0068876 A1 * | 3/2013 | Radu | ........... | B60F 5/02 244/2 |
| 2013/0289858 A1 | 10/2013 | Mangiat et al. | | |
| 2014/0032034 A1 * | 1/2014 | Raptopoulos | ........ | G08G 5/0069 701/25 |
| 2014/0136414 A1 | 5/2014 | Abhyanker | | |
| 2014/0172727 A1 * | 6/2014 | Abhyanker | ........ | G06Q 30/0645 705/307 |
| 2014/0180914 A1 * | 6/2014 | Abhyanker | ........ | G01C 1/00 705/39 |
| 2014/0379173 A1 * | 12/2014 | Knapp | ........... | G06Q 10/10 701/2 |
| 2015/0081362 A1 * | 3/2015 | Chadwick | ........... | G06Q 50/30 705/7.14 |
| 2015/0138000 A1 * | 5/2015 | Hartman | ........... | G08G 1/087 340/906 |
| 2015/0148988 A1 * | 5/2015 | Fleck | ........... | G05D 1/0011 701/2 |
| 2015/0185034 A1 * | 7/2015 | Abhyanker | ........... | G01C 21/36 701/23 |
| 2015/0278759 A1 * | 10/2015 | Harris | ........... | G06Q 10/08355 705/338 |

OTHER PUBLICATIONS

Written Opinion of the International Searching Authority for International Application No. PCT/EP2015/067201, mailed Oct. 19, 2015, 7 Pages.

Notification of Transmittal of Translation of the International Preliminary Report on Patentability (Chapter I or chapter II) for International Application No. PCT/EP2015/067201, mailed Oct. 19, 2015, 1 Page.

* cited by examiner

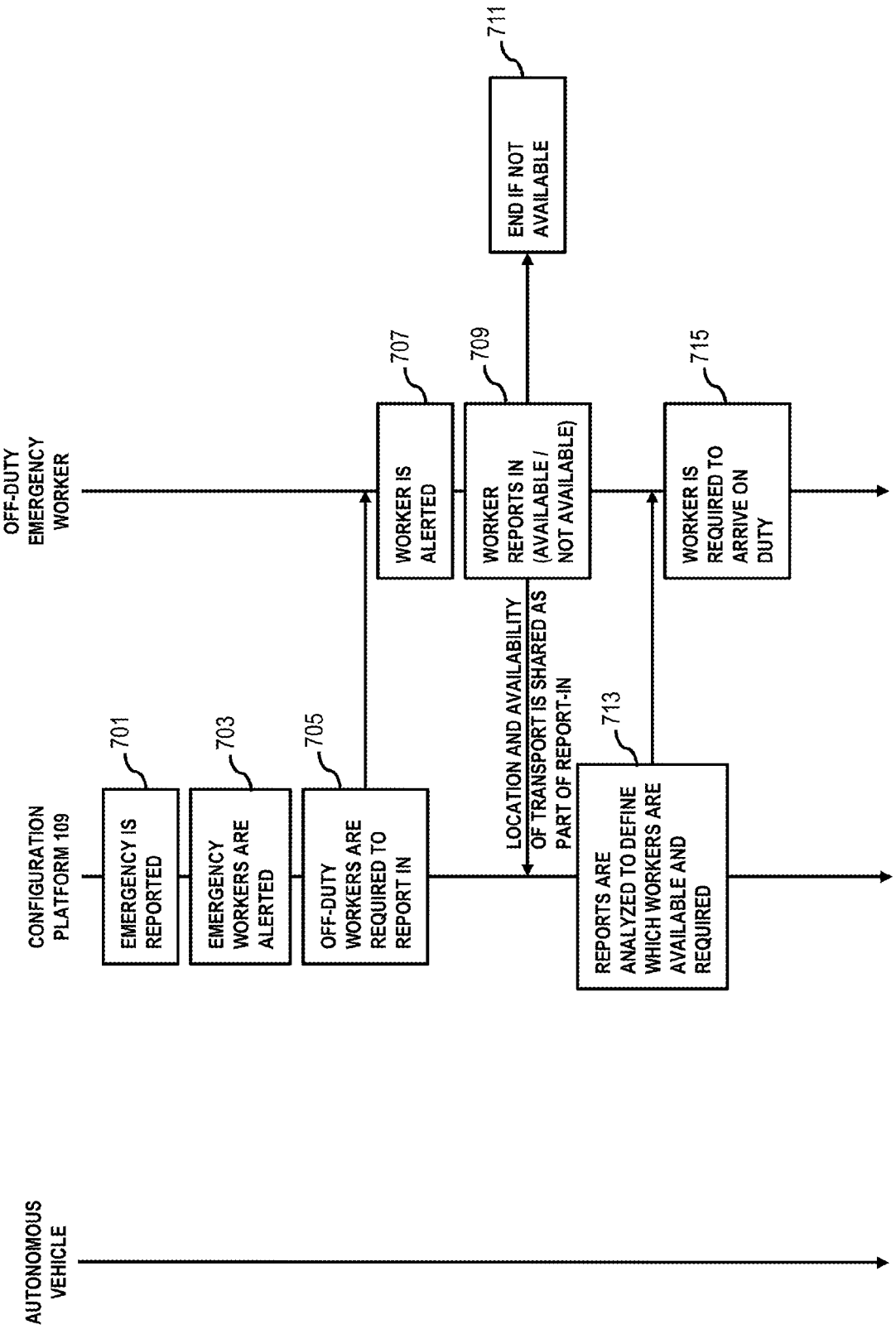

METHOD AND APPARATUS FOR PROVIDING ACCESS TO AUTONOMOUS VEHICLES BASED ON USER CONTEXT

BACKGROUND

Service providers and device manufacturers (e.g., wireless, cellular, etc.) are continually challenged to deliver value and convenience to consumers by, for example, providing compelling network services. One area of interest has been granting of access to autonomous vehicles, and configuring autonomous vehicles to provide assistance to one or more users during an emergency situation. However, difficulties encountered during the process of granting access to autonomous vehicles (e.g., authentication mechanism) and/or configuration of one or more autonomous vehicles (e.g., vehicle suitability) have not been properly addressed. Accordingly, service providers and device manufacturers face significant technical challenges in providing a service that grants access to suitable autonomous vehicles for providing assistance to users in an emergency situation or take users to the location where an emergency situation has occurred.

SOME EXAMPLE EMBODIMENTS

Therefore, there is a need for an approach for granting access to an autonomous vehicle based on validation of a request, and configuring an autonomous vehicle to transport a user and/or items to at least one destination.

According to one embodiment, a method comprises receiving a transport request for a transport of at least one user, at least one item, or a combination thereof to at least one destination. The method also comprises determining profile information associated with the at least one user, the at least one item, or a combination thereof, wherein the profile information specifies at least one role associated with the at least one user, the at least one item, or a combination thereof. The method further comprises causing, at least in part, a validation of the request based, at least in part, on a comparison of the at least one destination to one or more approved destinations associated with the at least one role. The method also comprises causing, at least in part, a granting of an access to one or more autonomous vehicles for the transport of the at least one user, the at least one item, or a combination thereof to the at least one destination based, at least in part, on the validation.

According to another embodiment, an apparatus comprises at least one processor, and at least one memory including computer program code for one or more computer programs, the at least one memory and the computer program code configured to, with the at least one processor, cause, at least in part, the apparatus to receive a transport request for a transport of at least one user, at least one item, or a combination thereof to at least one destination. The apparatus is also caused to determine profile information associated with the at least one user, the at least one item, or a combination thereof, wherein the profile information specifies at least one role associated with the at least one user, the at least one item, or a combination thereof. The apparatus is further caused to cause, at least in part, a validation of the request based, at least in part, on a comparison of the at least one destination to one or more approved destinations associated with the at least one role.

According to another embodiment, a computer-readable storage medium carries one or more sequences of one or more instructions which, when executed by one or more processors, cause, at least in part, an apparatus to receive a transport request for a transport of at least one user, at least one item, or a combination thereof to at least one destination. The apparatus is also caused to determine profile information associated with the at least one user, the at least one item, or a combination thereof, wherein the profile information specifies at least one role associated with the at least one user, the at least one item, or a combination thereof. The apparatus is further caused to cause, at least in part, a validation of the request based, at least in part, on a comparison of the at least one destination to one or more approved destinations associated with the at least one role. The apparatus is also caused to cause, at least in part, a granting of an access to one or more autonomous vehicles for the transport of the at least one user, the at least one item, or a combination thereof to the at least one destination based, at least in part, on the validation.

According to another embodiment, an apparatus comprises means for receiving a transport request for a transport of at least one user, at least one item, or a combination thereof to at least one destination. The apparatus also comprises means for determining profile information associated with the at least one user, the at least one item, or a combination thereof, wherein the profile information specifies at least one role associated with the at least one user, the at least one item, or a combination thereof. The apparatus further comprises means for causing, at least in part, a validation of the request based, at least in part, on a comparison of the at least one destination to one or more approved destinations associated with the at least one role. The apparatus also comprises means for causing, at least in part, a granting of an access to one or more autonomous vehicles for the transport of the at least one user, the at least one item, or a combination thereof to the at least one destination based, at least in part, on the validation.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 7A-7C are ladder diagrams utilized in the process of determining an emergency situation and causing a configuration of at least one autonomous vehicle to travel to the at least one pick-up location and/or at least one drop-off location, according to one example embodiment;

DESCRIPTION OF SOME EMBODIMENTS

Examples of a method, apparatus, and computer program for granting access to an autonomous vehicle based on validation of a request, and configuring an autonomous vehicle to transport a user and/or items to at least one destination are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
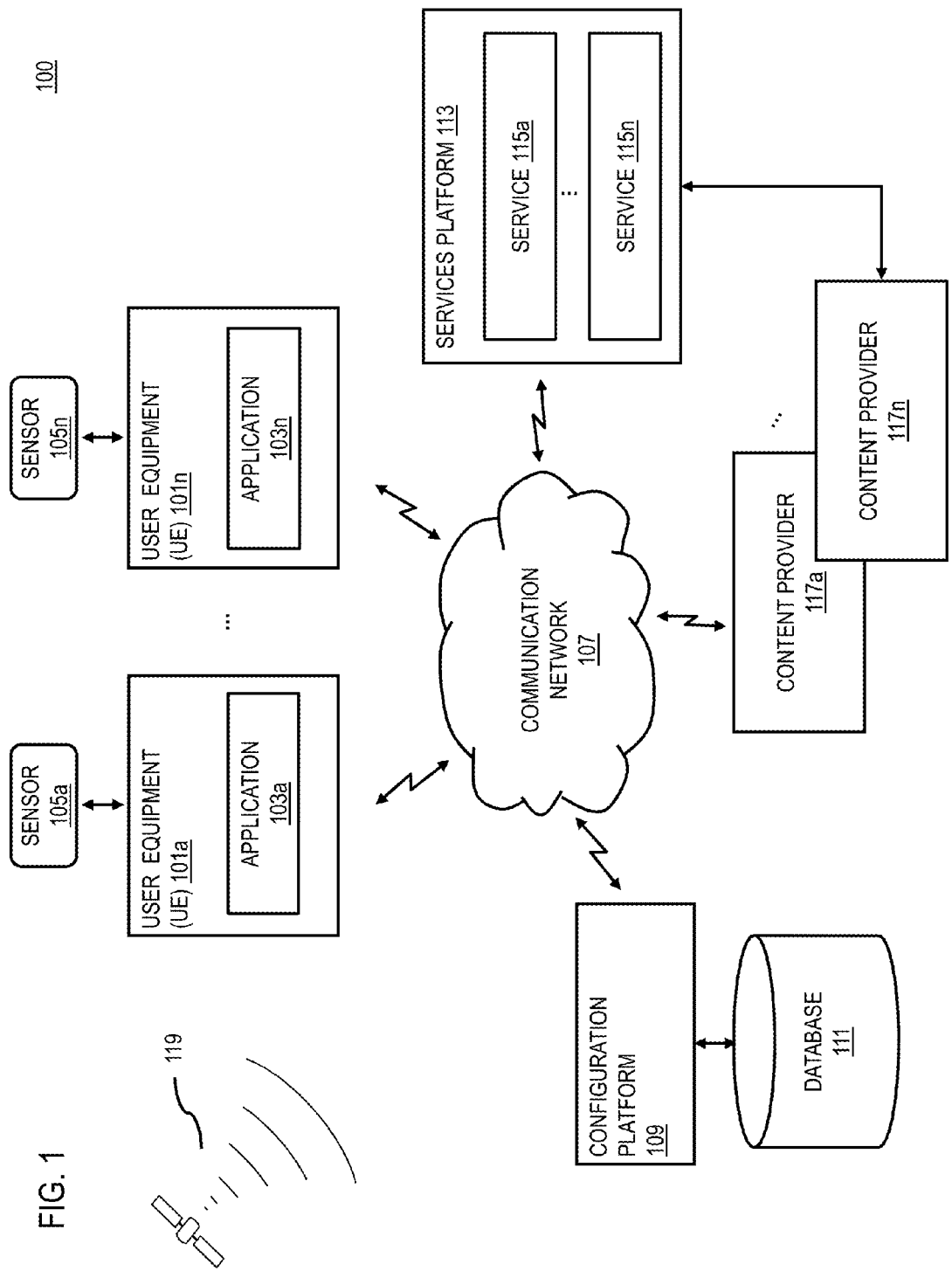
FIG. 1 is a diagram of a system capable of granting access to an autonomous vehicle based on validation of a request, and configuring an autonomous vehicle to transport a user and/or items to at least one destination, according to one embodiment.

FIG. 1 is a diagram of a system capable of granting access to an autonomous vehicle based on validation of a request, and configuring an autonomous vehicle to transport a user and/or items to at least one destination, according to one embodiment. As mentioned, one or more users (e.g., emergency workers, fire-fighters, police officers, etc.) may experience difficulties accessing at least one vehicle intended for emergency situations. For example, though the users may have access to vehicles during their duty, the overall number of available vehicles could be limited to support the number of workers in a normal work shift. In one example embodiment, a fire department may usually own one vehicle that can carry a maximum of six firefighters, while there may be other emergency workers available to travel to the scenes of emergency. Since most of the emergency workers rely on the availability of vehicles to reach the scene of emergency, it is a necessity to either increase the number of vehicles available at the fire departments or find alternative ways of transporting the emergency workers to the scene of emergency. As a result, there is a need for a method wherein one or more users may take over a privately owned vehicle during an emergency situation.

However, taking over a privately owned vehicle requires access to vehicle keys, which in most cases is not possible without stopping a vehicle on the street. In addition, the acquired vehicle may not be suitable for the required purpose, for example, the vehicle might not have enough fuel, might not be able to reach a destination (four wheel drive, winter tires, etc. required). Further, the right to take over a vehicle could lead to misuse of the right, thus there is a need for validating the emergency worker's right to a vehicle. At present, vehicles (e.g., taxis, autonomous taxis, ride-sharing and rental car services, etc.) does not restrict their user from manipulating the routes. For example, users are not constrained within the determined routes based, at least in part, on the scene of emergency, point of interest (e.g., hospital), the role of the person using the vehicle, or a combination thereof. Accordingly, autonomous vehicles use must be monitored on a regular basis to make sure that the vehicle is used for the correct purpose, and penalizing the users of the vehicle for any misuse. Moreover, there is a need to compensate the owner of the vehicle for using the vehicle.

To address this problem, a system 100 of FIG. 1 introduces a solution that allows the users to locate one or more autonomous vehicle suitable for reaching the scene of emergency. Hence, the one or more identified users may easily locate suitable autonomous vehicle capable of taking the worker to the scene of emergency following the rules-set for the user. In one example embodiment, a firefighter may be required at the scene of an accident, the firefighter may be picked up by a four-wheel drive autonomous SUV, the vehicle may take the firemen to the fire department to collect the equipment and from there to the scene of the accident. Similar solution may be applicable to provide equipment to one or more users for performing emergency services, for example, fire department operator may send additional equipment to the firefighters on duty without leaving the post at the fire station.

As shown in FIG. 1, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to a configuration platform 109 via the communication network 107. In one embodiment, the configuration platform 109 performs one or more functions associated with granting access to an autonomous vehicle based on validation of a request, and configuring an autonomous vehicle to transport a user and/or items to at least one destination.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). In one embodiment, the one or more vehicles may have cellular or Wi-Fi connection either through the inbuilt communication equipment or from the UE 101 associated with the vehicles. The applications 103 may assist in conveying sensor information via the communication network 107.

By way of example, the applications 103 may be any type of application that is executable at the UE 101, such as location-based service applications, navigation applications, mapping application, content provisioning services, camera/imaging application, media player applications, social networking applications, calendar applications, and the like. In one embodiment, one of the applications 103 at the UE 101 may act as a client for the configuration platform 109 and perform one or more functions associated with the functions of the configuration platform 109 by interacting with the configuration platform 109 over the communication network 107. In one scenario, applications 103 may be an authenticating application for granting access to one or more autonomous vehicles based on a validation mechanism. In another scenario, applications 103 may be a location based application interfacing with the services platform 113 via the communication network 107 for accessing turn-by-turn navigation, routing information, maps, driving instructions, etc.

By way of example, the sensors 105 may be any type of sensor. In certain embodiments, the sensors 105 may include, for example, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, and the like. In one example embodiment, the UE 101 may include GPS receivers to obtain geographic coordinates from satellites 119 for determining current location and time associated with the UE 101. In another example embodiment, the one or more sensors may provide in-vehicle navigation services, wherein one or more location based services may be provided to the at least one UE 101 associated with the at least one user of the vehicle and/or at least one other UE 101 associated with the at least one vehicle. In a further example embodiment, the sensors 105 may include, for example, a fuel level sensor to indicate the level of fuel in a vehicle, light sensors, oriental sensors augmented with height sensor and acceleration sensor, tilt sensors, moisture sensors, pressure sensors, audio sensors (e.g., microphone) etc.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the configuration platform 109 may be a platform with multiple interconnected components. The configuration platform 109 may include multiple servers, intelligent networking devices, computing devices, components and corresponding software for granting access to an autonomous vehicle based on validation of a request, and configuring an autonomous vehicle to transport a user and/or items to at least one destination. In addition, it is noted that the configuration platform 109 may be a separate entity of the system 100, a part of the one or more services 115a-115n (collectively referred to as services 115) of the services platform 113, or included within the UE 101 (e.g., as part of the applications 103).

In one embodiment, the configuration platform 109 may receive a transport request from a user (e.g. fireman) for a transport to at least one destination. Then, the configuration platform 109 may determine the profile information of the user, for example, the configuration platform 109 may determine that the user is an emergency worker. Subsequently, the configuration platform 109 may validate the travel request by comparing the destination of the user to one or more approved destinations associated with the at least one role. Next, the configuration platform 109 may grant the user an access to the autonomous vehicle for transport to the at least one destination. In one example embodiment, the configuration platform 109 may grant emergency workers with access to autonomous vehicles. Similarly, the configuration platform 109 may provide access users (e.g., non-emergency workers) in need of assistance with access to autonomous vehicles. For example, an injured person calling 911 may be granted access to nearby autonomous vehicle by the configuration platform 109. The autonomous vehicles may be programmed to take the injured person to pre-defined hospital. In another example embodiment, the configuration platform 109 may restrict a user from altering vehicle routes or make additional stopovers. The configuration platform 109 may constantly monitor the vehicle movement and/or position within the calculated route, and upon detecting any inconsistencies may redirect the vehicle to a police station. In a further example embodiment, the configuration platform 109 may monitor the condition of one or more users via one or more cameras associated with the autonomous vehicle. In such manner, the configuration platform 109 may follow-up on the situation of a user (e.g., an injured person) and may have a dialog with the user, for example, guide the user to press the wound properly. In one scenario, the configuration platform 109 may collect information from the injured user, and may transmit the information to the hospital prior to the arrival of the injured user, thereby reducing the check-in time required for admittance of the user at the hospital.

In one embodiment, the database 111 may store profile information, items information and/or location based information for specific users from the sensors 105, the configuration platform 109, the services platform 113 and/or one or more content providers 117a-117n (collectively referred to as content provider 117). The information may be any multiple types of information that can provide means for aiding in the content provisioning and sharing process. In another embodiment, the database 111 may store routing and/or navigation information towards one or more points of interest. In one scenario, profile information for one or more user (e.g., emergency workers) may be recorded in the database 111. The profile information may include role and profession of a user, for example, any special skills of the user. In one scenario, special skills of a user may include operating different vehicles, using tools, first aid knowledge, certifications, licenses etc. The configuration platform 109 may access the profile information for at least one user, whereupon the chosen user is required to report in when they are alerted.

The services platform 113 may include any type of service. By way of example, the services platform 113 may include mapping services, navigation services, travel planning services, social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the configuration platform 109 and the content provider 117 to supplement or aid in the processing of the content information.

By way of example, the services 115 may be an online service that reflects interests and/or activities of users. In one scenario, the services 115 provide representations of each user (e.g., a profile), his/her social links, and a variety of additional information. The services 115 allow users to share location information, activities information, contextual information, historical user information and interests within their individual networks, and provides for data portability. The services 115 may additionally assist in providing the configuration platform 109 with travel information of the one or more geo-routes and/or location anchors, etc.

The content provider 117 may provide content to the UE 101, the configuration platform 109, and the services 115 of the services platform 113. The content provided may be any type of content, such as textual content, audio content, video content, image content, etc. In one embodiment, the content provider 117 may provide content that may supplement content of the applications 103, the sensors 105, or a combination thereof. By way of example, the content provider 117 may provide content that may aid in the processing of profile information, location information, or a combination thereof. In one embodiment, the content provider 117 may also store content associated with the UE 101, the configuration platform 109, and the services 115 of the services platform 113. In another embodiment, the content provider 117 may manage access to a central repository of data, and offer a consistent, standard interface to data, such as a repository of users' profile information, navigational data content etc. Any known or still developing methods, techniques or processes for generating, retrieving and/or accessing location information and/or profile information from one or more sources may be employed by the configuration platform 109.

By way of example, the UE 101, the configuration platform 109, the services platform 113, and the content provider 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
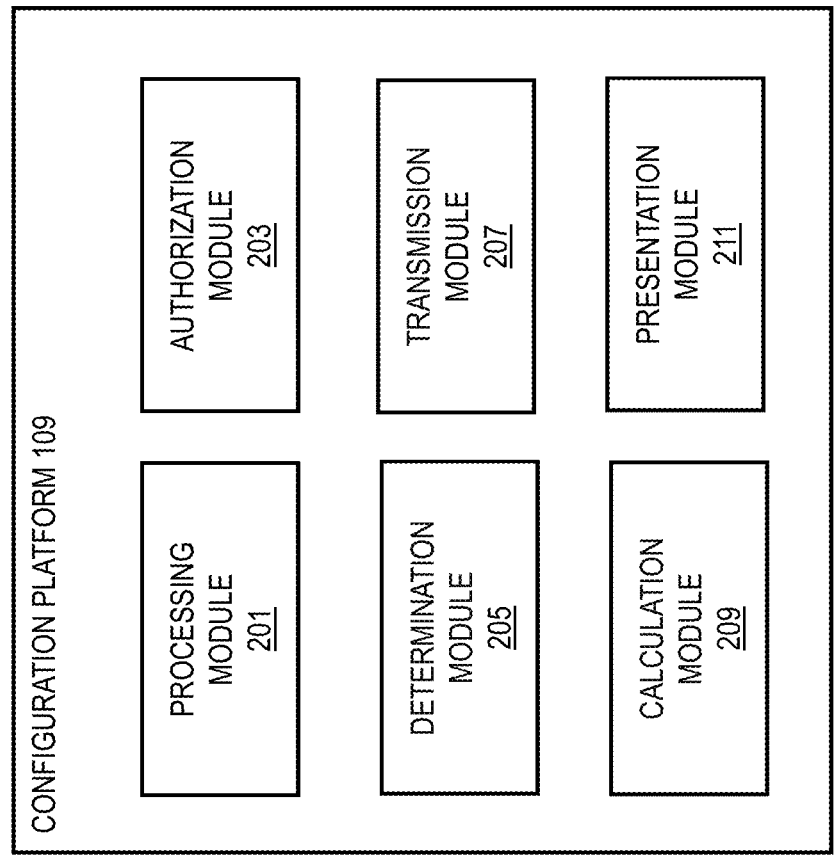
FIG. 2 is a diagram of the components of the configuration platform 109, according to one embodiment.

FIG. 2 is a diagram of the components of the configuration platform 109, according to one embodiment. By way of example, the configuration platform 109 includes one or more components for granting access to an autonomous vehicle based on validation of a request, and configuring an autonomous vehicle to transport a user and/or items to at least one destination. In this embodiment, the configuration platform 109 includes a processing module 201, an authorization module 203, a determination module 205, a transmission module 207, a calculation module 209, and a presentation module 211. It is contemplated that the functions of these components may be combined in one or more components or performed by other components of equivalent functionality.

In one embodiment, the processing module 201 may receive a transport request for transporting a user and/or an item to at least one destination. The processing module 201 may process the transport request to determine the profile information, an emergency situation, or a combination thereof. In one scenario, the profile information specifies at least one role of a user for providing a service during an emergency situation.

In one embodiment, the authorization module 203 may validate a transport request. The validation is based on a comparison of at least one destination to one or more approved destinations associated with the role of a user. In another embodiment, the authorization module 203 may grant access to an autonomous vehicle for transporting users and/or items to the at least one destination based, at least in part, on the validation.

In one embodiment, the determination module 205 may determine location information for one or more users, at least one scene of emergency situation, or a combination thereof. In another embodiment, the determination module 205 may determine at least one autonomous vehicle based, at least in part, on physical proximity information, temporal proximity information, resource availability information, mobility information, or a combination thereof. In a further embodiment, the determination module 205 may determine availability information for one or more users based, at least in part, on the response to the at least one notification. In another embodiment, the determination module 205 may determine availability information for one or more items of interest at the at least one destination.

In one embodiment, the transmission module 207 may cause a transmission of one or more notifications to one or more autonomous vehicles, one or more devices associated with at least one autonomous vehicle, or a combination thereof. In one scenario, the one or more notification includes one or more requests, authorization information, routing information, or a combination thereof. In another scenario, the transmission of one or more notifications is based, at least in part, on proximity information, autonomous vehicle capability information, or a combination thereof. In another embodiment, the transmission module 207 may transmit the determined information received from the determination module 205 to the configuration platform 109, whereupon the configuration platform 109 may configure at least one autonomous vehicle to travel to the at least one pick-up location, at least one drop-off location, or a combination thereof.

In one embodiment, the calculation module 209 may cause a calculation of at least one route based, at least in part, on user location, distance parameter, an estimated time of arrival, or a combination thereof. In another embodiment, the calculation module 209 may cause a restriction on the modification of at least one calculated route. In a further embodiment, the calculation module 209 may cause a recommendation of at least one alternate destination based, at least in part, on the availability information of the one or more items of interest. In another embodiment, the calculation module 209 may cause a cancellation of the current routing and/or navigation information of one or more devices associated with at least one autonomous vehicle.

In one embodiment, the presentation module 211 may cause a presentation of at least one message regarding the availability of at least one user. In another embodiment, the presentation module 211 may replace the current routing and/or navigation information by the newly calculated routing and/or navigation information. In a further embodiment, the presentation module 211 may cause a presentation of the progression information for the at least one autonomous vehicle within the calculated route.

The above presented modules and components of the configuration platform 109 can be implemented in hardware, firmware, software, or a combination thereof. Though depicted as a separate entity in FIG. 1, it is contemplated that the configuration platform 109 may be implemented for direct operation by respective UE 101. As such, the configuration platform 109 may generate direct signal inputs by way of the operating system of the UE 101 for interacting with the applications 103. In another embodiment, one or more of the modules 201-211 may be implemented for operation by respective UEs, the configuration platform 109, or combination thereof. Still further, the configuration platform 109 may be integrated for direct operation with services 115, such as in the form of a widget or applet, in accordance with an information and/or subscriber sharing arrangement. The various executions presented herein contemplate any and all arrangements and models.

Figure 3:
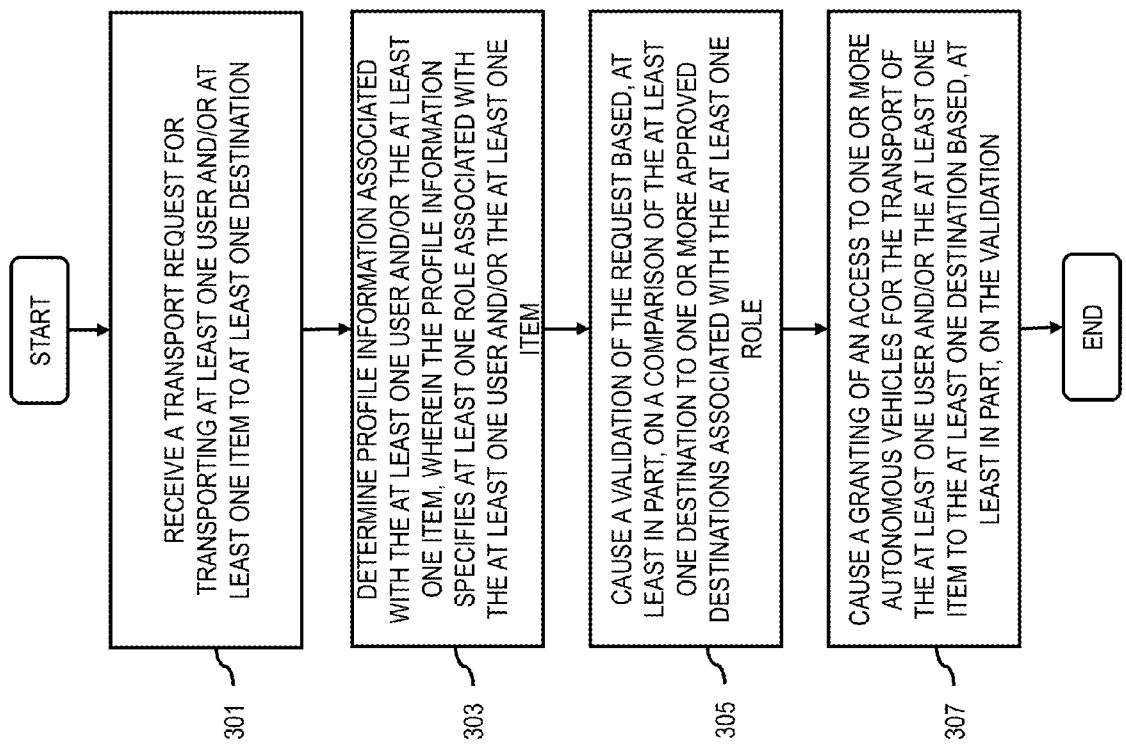
FIG. 3 is a flowchart of a process for determining profile information based on transport requests to cause a validation of the request for granting access to autonomous vehicles, according to one embodiment.
Figure 10:
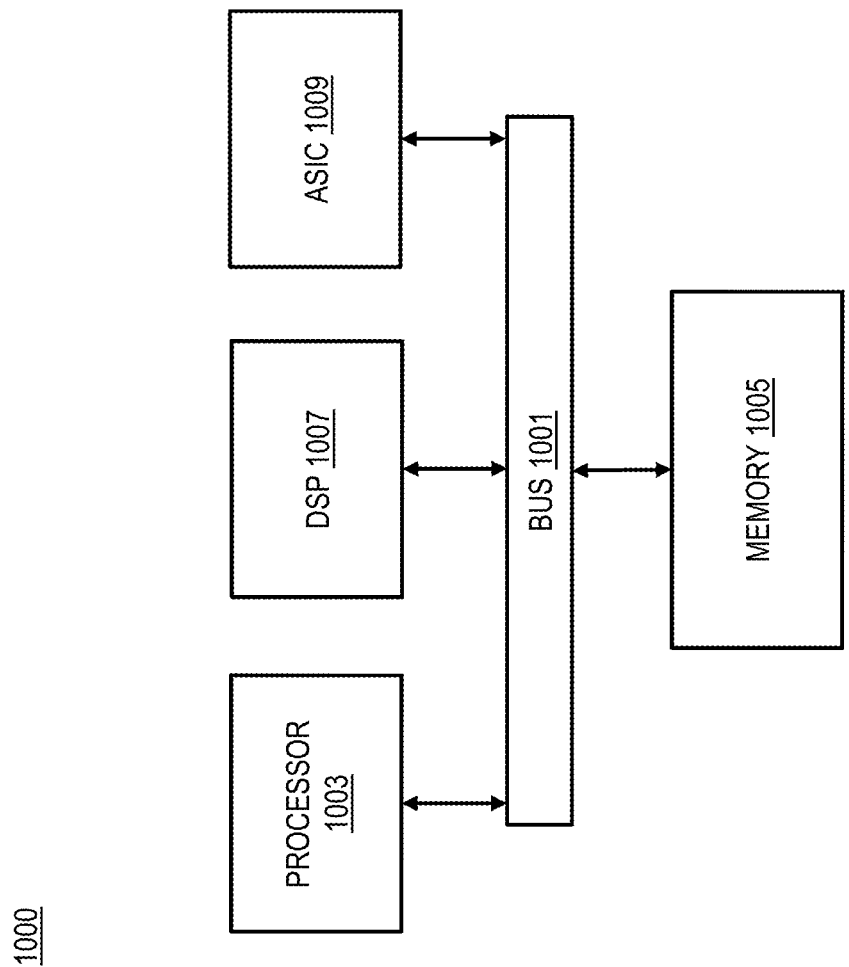
FIG. 10 is a diagram of a chip set that can be used to implement an embodiment of the invention.

FIG. 3 is a flowchart of a process for determining profile information based on transport requests to cause a validation of the request for granting access to autonomous vehicles, according to one embodiment. In one embodiment, the configuration platform 109 performs the process 300 and is implemented in, for instance, a chip set including a processor and a memory as shown in FIG. 10.

In step 301, the configuration platform 109 may receive a transport request for a transport at least one user, at least one item, or a combination thereof to at least one destination. In one scenario, one or more users (e.g., emergency workers) may send requests to the configuration platform 109 for transporting them to the location of an emergency situation. In another scenario, one or more users (e.g., non-emergency workers) may send requests to the configuration platform 109 seeking assistance during an emergency situation.

In step 303, the configuration platform 109 may determine profile information associated with the at least one user, the at least one item, or a combination thereof, wherein the profile information specifies at least one role associated with the at least one user, the at least one item, or a combination thereof. In one embodiment, the at least one role is associated with one or more emergency services; and wherein the at least one user, the at least one item, or a combination thereof is associated with at least one provider, at least one recipient, or a combination thereof of the one or more emergency services. In one example embodiment, the configuration platform 109 may process the profile information for at least one user to determine that the user is a firefighter. Consequently, the configuration platform 109 may process a request to determine the type of assistance required during an emergency situation (e.g., Cardiopulmonary resuscitation (i.e., CPR)). Then, the configuration platform 109 may determine the items required by the firefighter to provide such assistance during the emergency situation.

In step 305, the configuration platform 109 may cause, at least in part, a validation of the request based, at least in part, on a comparison of the at least one destination to one or more approved destinations associated with the at least one role. In one scenario, the configuration platform 109 may compare at least one requested destination with one or more approved destination. In one example embodiment, the configuration platform 109 upon determining that a user is a fireman may allow the user to stopover at a location for collecting equipment's required for providing assistance during an emergency situation. The one or more stopover location must be an approved stopover locations.

In step 307, the configuration platform 109 may cause, at least in part, a granting of an access to one or more autonomous vehicles for the transport of the at least one user, the at least one item, or a combination thereof to the at least one destination based, at least in part, on the validation. In one scenario, the configuration platform 109 may restrict an approved user from altering routes or make additional stopovers.

Figure 4:
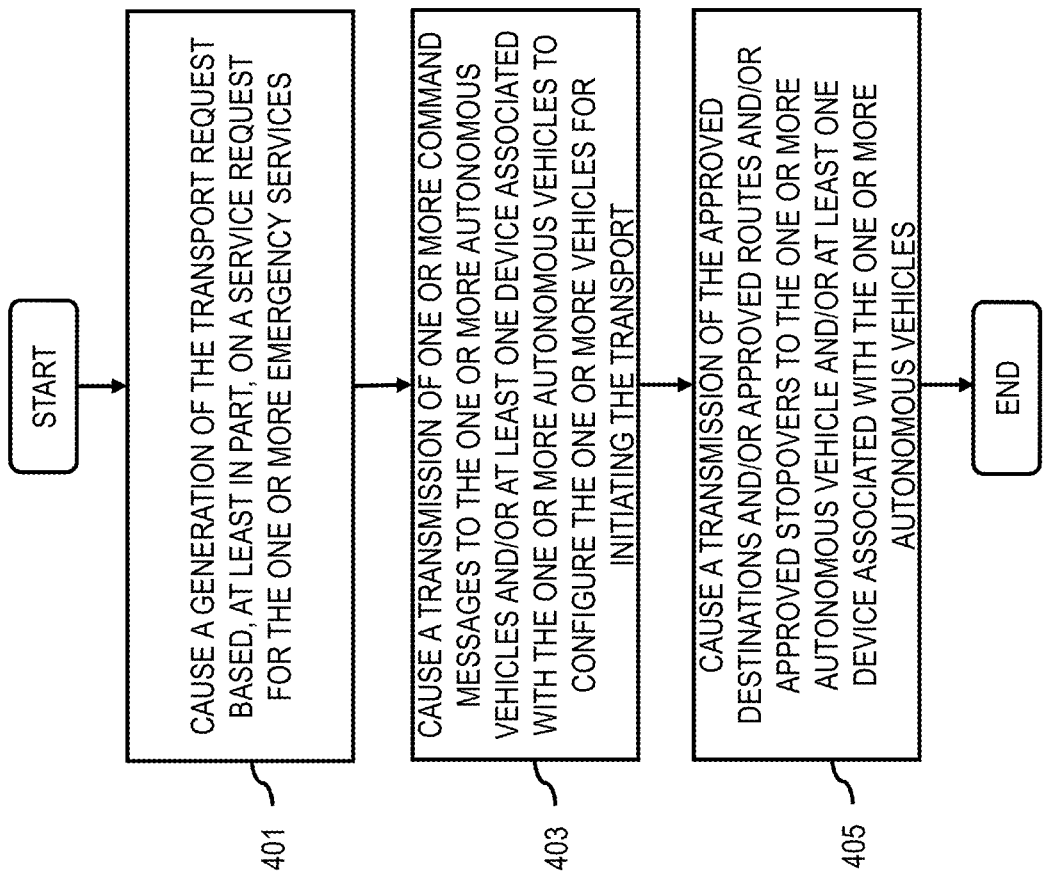
FIG. 4 is a flowchart of a process for causing a transmission of command messages and/or approved routing information to autonomous vehicles and/or devices associated with autonomous vehicles based, at least in part, on the transport request, according to one embodiment.

FIG. 4 is a flowchart of a process for causing a transmission of command messages and/or approved routing information to autonomous vehicles and/or devices associated with autonomous vehicles based, at least in part, on the transport request, according to one embodiment. In one embodiment, the configuration platform 109 performs the process 400 and is implemented in, for instance, a chip set including a processor and a memory as shown in FIG. 10.

In step 401, the configuration platform 109 may cause, at least in part, a generation of the transport request based, at least in part, on a service request for the one or more emergency services. In one embodiment, the service request specifies the one or more approved destinations, one or more approved routes, one or more approved stopovers, or a combination thereof. In one scenario, the location information includes current location of at least one autonomous vehicle, current location of at least one user, at least one destination location (e.g., the scene of emergency), or a combination thereof. The configuration platform 109 upon determining the profile information of at least one user (e.g., a user may be a fireman) may approve one or more stopover location (i.e., for collecting items for providing assistance). Subsequently, the configuration platform 109 may calculate a fastest route to the destination location.

In step 403, the configuration platform 109 may cause, at least in part, a transmission of one or more command messages to the one or more autonomous vehicles, at least one device associated with the one or more autonomous vehicles, or a combination thereof to configure the one or more vehicles for initiating the transport. In one scenario, the one or more command messages include request information and authorization information to configure the autonomous vehicle to travel to the at least one pick-up location, at least one drop-off location, or a combination thereof. In one embodiment, the one or more command messages causes, at least in part, a cancellation of one or more current navigation instructions of the one or more autonomous vehicles. In one scenario, the configuration platform 109 may terminate the in progress travel plans of at least one autonomous vehicle. The configuration platform 109 may cancel the ongoing routing information and/or navigation information for at least one autonomous vehicle to substitute it with the determined routing information and/or navigation information to at least one destination (e.g., the scene of emergency).

In step 405, the configuration platform 109 may cause, at least in part, a transmission of the one or more approved destinations, one or more approved routes, one or more approved stopovers, or a combination to the one or more autonomous vehicle, at least one device associated with the one or more autonomous vehicles, or a combination thereof. In one embodiment, the one or more autonomous vehicles are restricted to the at least one autonomous vehicle, at least one device associated with the one or more autonomous vehicles, or a combination thereof during the transport of the at least one user, the at least one item, or a combination thereof to the at least one destination. In one scenario, the one or more users using an autonomous vehicle to travel to the scene of emergency are restricted from modifying the approved route.

Figure 5:
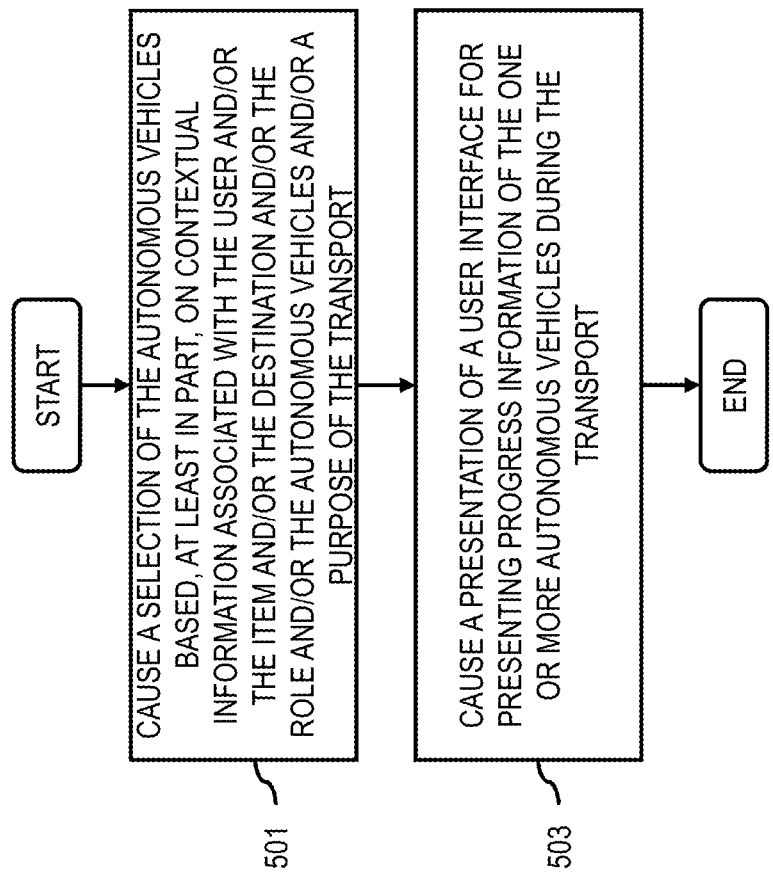
FIG. 5 is a flowchart of a process for causing a presentation of progress information for at least one autonomous vehicle, and selection of one or more autonomous vehicles, according to one embodiment.

FIG. 5 is a flowchart of a process for causing a presentation of progress information for at least one autonomous vehicle, and selection of one or more autonomous vehicles, according to one embodiment. In one embodiment, the configuration platform 109 performs the process 500 and is implemented in, for instance, a chip set including a processor and a memory as shown in FIG. 10.

In step 501, the configuration platform 109 may cause, at least in part, a presentation of a user interface for presenting progress information of the one or more autonomous vehicles during the transport. In one scenario, the one or more users may be presented with the progress information for at least one autonomous vehicle in their respective UE 101. The progress information may assist the users in estimating their pick-up time, their time of arrival at the scene of emergency etc.

In step 503, the configuration platform 109 may cause, at least in part, a selection of the one or more autonomous vehicles based, at least in part, on contextual information associated with the at least one user, the at least one item, the at least one destination, the at least one role, the one or more autonomous vehicles, a purpose of the transport, or a combination thereof. In one embodiment, the contextual information associated with the one or more autonomous vehicles include, at least in part, fuel availability information, vehicle configuration information, passenger capacity information, cargo capacity information, or a combination thereof. In one scenario, the configuration platform 109 may select an autonomous vehicle based on mobility information, for example, an autonomous vehicle that can drive smoothly in a rocky terrain because the location of the emergency situation is rock-strewn. In another scenario, the configuration platform 109 may select an autonomous vehicle based on resource availability information, for example, an autonomous vehicle with cameras and radios may be selected to monitor the health of an injured user and to provide instructions to the injured user. In a further scenario, the configuration platform 109 may select an autonomous vehicle with sufficient fuel to ensure that there are no disruptions in providing assistance. In another scenario, the configuration platform 109 may select an autonomous vehicle based on the number of passenger it can accommodate, for example, an autonomous vehicle that can accommodate a group of injured users in a safe and convenient manner. In another scenario, the configuration platform 109 may select an autonomous vehicle that has capacity for the items essential to provide assistance during an emergency situation.

Figure 6:
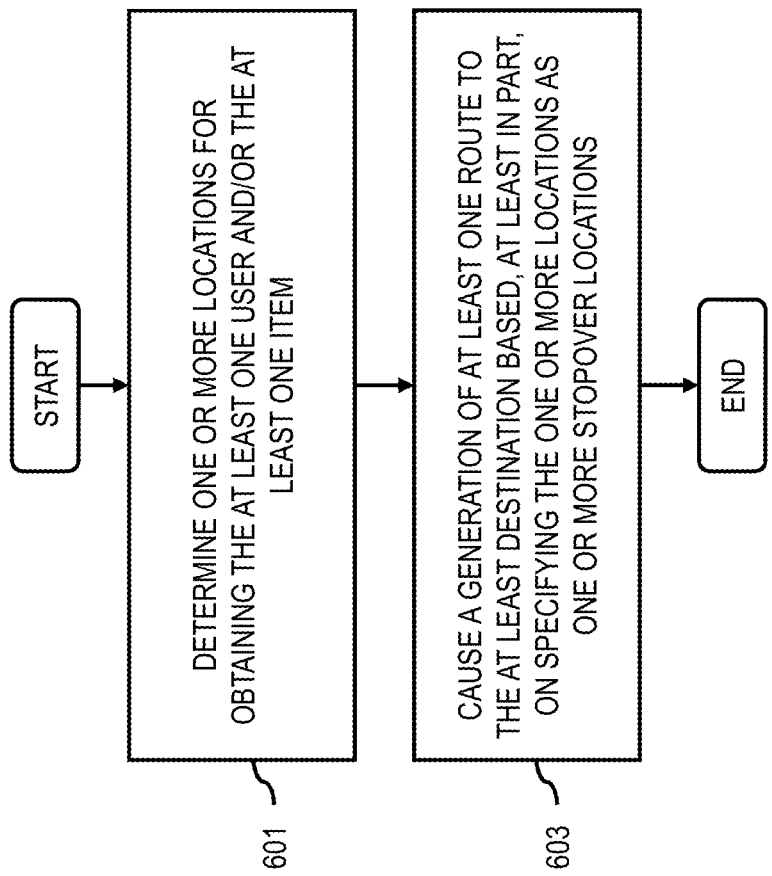
FIG. 6 is a flowchart of a process for determining a pick-up location, and generating routing information to at least one destination based on the pick-up location, according to one embodiment.

FIG. 6 is a flowchart of a process for determining a pick-up location, and generating routing information to at least one destination based on the pick-up location, according to one embodiment. In one embodiment, the configuration platform 109 performs the process 600 and is implemented in, for instance, a chip set including a processor and a memory as shown in FIG. 10.

In step 601, the configuration platform 109 may determine one or more locations for obtaining the at least one user, the at least one item, or a combination thereof. In one scenario, the configuration platform 109 may determine the pick-up location for at least one user via one or more sensors 105 associated with their respective UE 101s. In another scenario, the configuration platform 109 may access the location information for one or more items from the database 111 based, at least in part, on profile information for at least one user.

In step 603, the configuration platform 109 may cause, at least in part, a generation of at least one route to the at least destination based, at least in part, on specifying the one or more locations as one or more stopover locations. In one scenario, the configuration platform 109 may calculate at least one route based, at least in part, on user location, destination location, one or more stopover location, or a combination thereof. In another scenario, the calculation of at least one route is based, at least in part, on the distance parameter, an estimated time of arrival parameter, or a combination thereof.

Figure 7B:
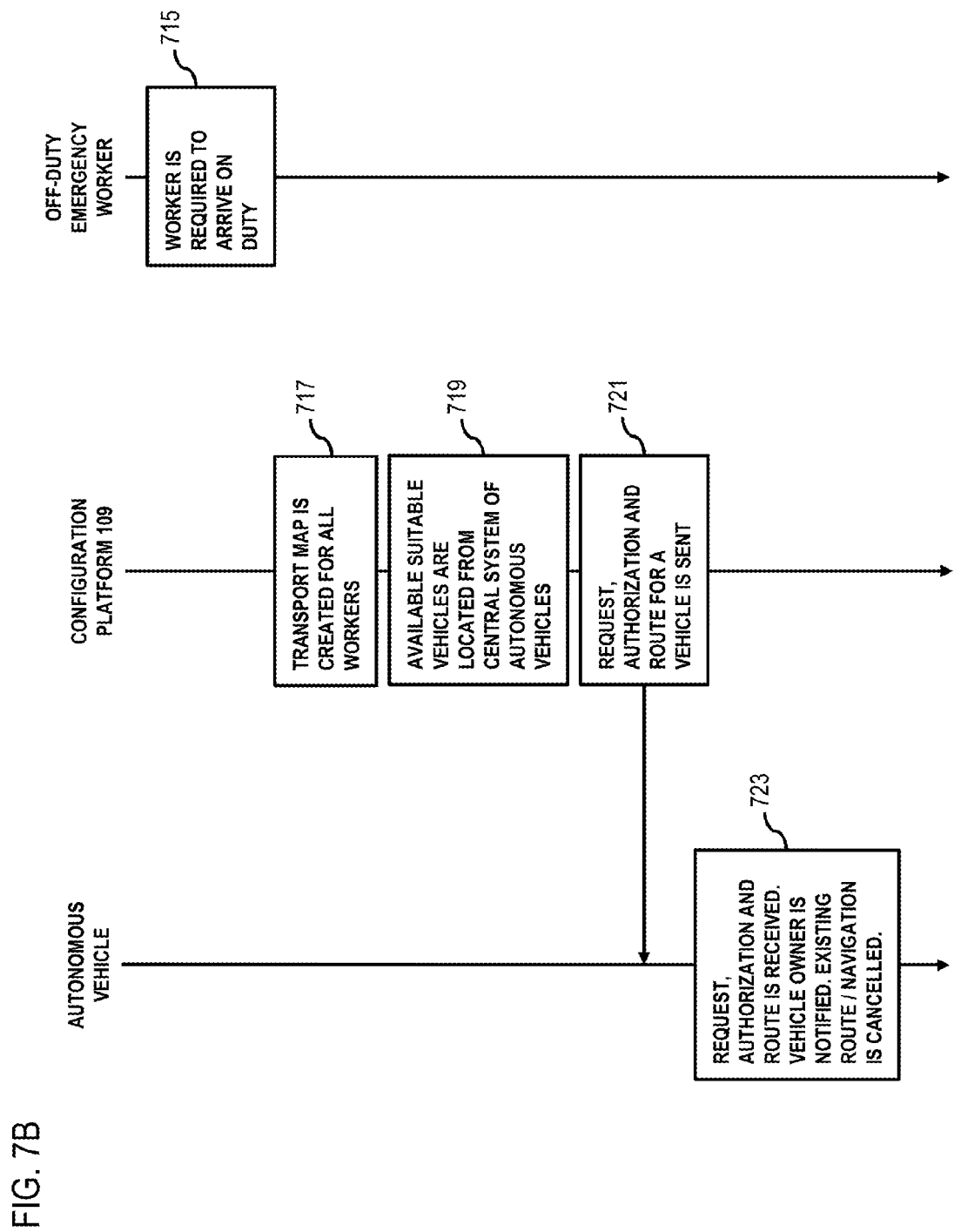
Figure 7C:
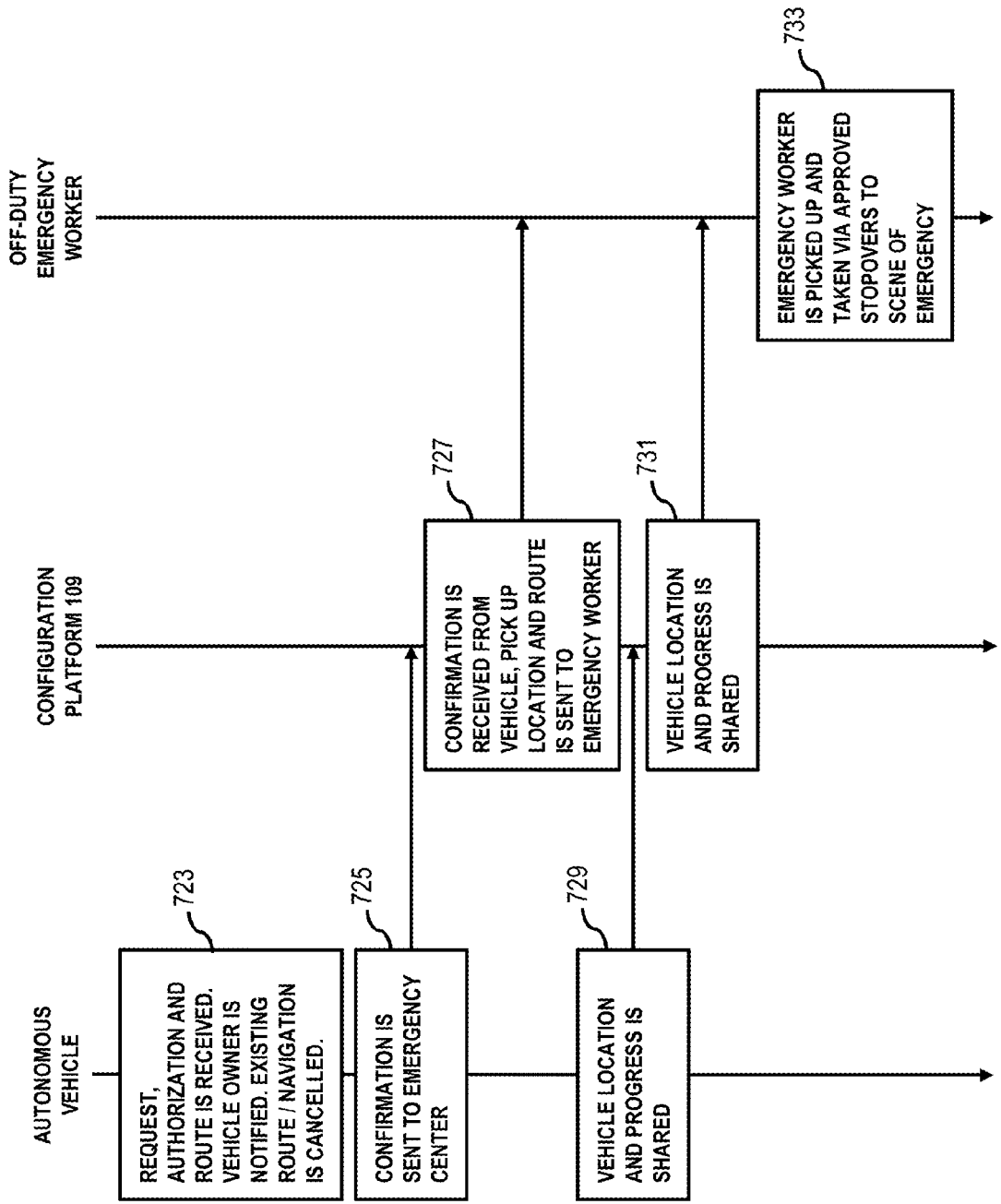

FIGS. 7A-7C are ladder diagrams utilized in the process of determining an emergency situation and causing a configuration of at least one autonomous vehicle to travel to the at least one pick-up location and/or at least one drop-off location, according to one example embodiment. In one scenario, a user may be a consumer using a UE 101, an emergency worker using UE 101 etc. In one scenario, the configuration platform 109 may receive information regarding an emergency situation [701]. The emergency situation may be circumstances wherein at least one user needs assistance and/or at least one user (e.g., emergency worker) needs to travel to a location where the emergency situation has occurred to provide assistance. Then, the configuration platform 109 may cause a notification to one or more users (e.g., off-duty emergency workers) with regards to the emergency situation [703, 705, 707]. The one or more notified user may provide a response to the configuration platform 109 regarding their availability [709]. The configuration platform 109 may process the response to determine the location and availability of at least one mode of transportation. Further, the configuration platform 109 may analyze the response from the users and may send a confirmation to the users that they are scheduled to arrive at the location of the emergency situation [713]. The available users are required to arrive on the scene of emergency [715, 715]. Subsequently, the configuration platform 109 may calculate routing information from the available users' current location to the location of the emergency situation. The configuration platform 109 may create a transport map which may be provided to all the available users [717]. Next, the configuration platform 109 may locate available suitable autonomous vehicles from the central system of autonomous vehicles [719]. Then, the configuration platform 109 may send a request, authorization and route information to the at least one selected autonomous vehicle [721]. At step 723, the at least one autonomous vehicle may receive a request, authorization instructions, and route information. The owner of the autonomous vehicle is also notified on the emergency situation and the need for the at least one user to access the vehicle to reach the location of the emergency situation. The configuration platform 109 may cancel the existing route and navigation information in the at least one selected autonomous vehicle and may replace it with the newly calculated route information [723]. At step 725, the at least one autonomous vehicle may send a confirmation to the configuration platform 109, whereupon the configuration platform 109 may send pick-up location and route information to the at least one user [727]. In addition, the autonomous vehicle may share its location information and/or progression information within the newly prescribed route with the configuration platform 109 [729]. Subsequently, the configuration platform 109 may share the location information and/or progression information provided by the at least one autonomous vehicle with the at least one user [731]. At step 733, the at least one user is picked up by the autonomous vehicle and is taken to the scene of emergency through the approved route.

Figure 8A:
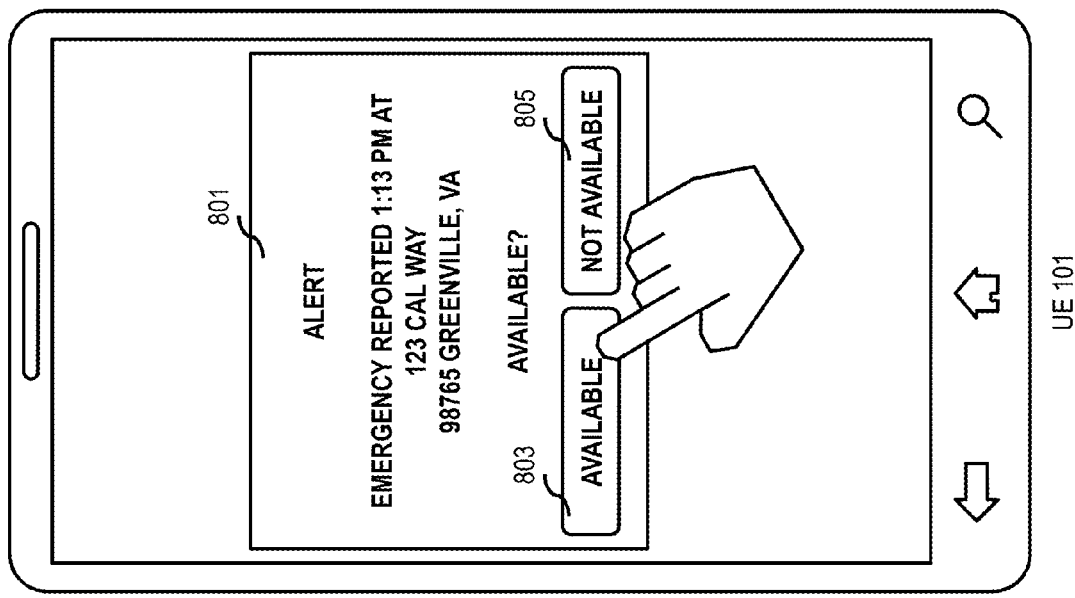
FIGS. 8A-8C are user interface diagrams that represent a scenario wherein at least one user is granted access to an autonomous vehicle, and the at least one autonomous vehicle is configured to travel to the location of an emergency situation, according to one example embodiment.
Figure 8B:
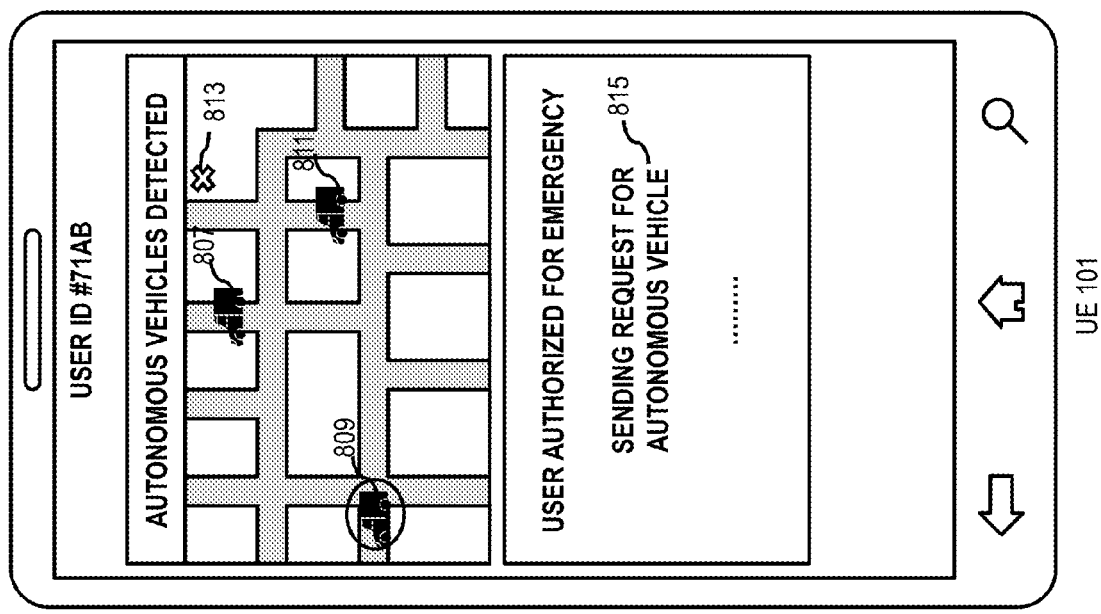
Figure 8C:
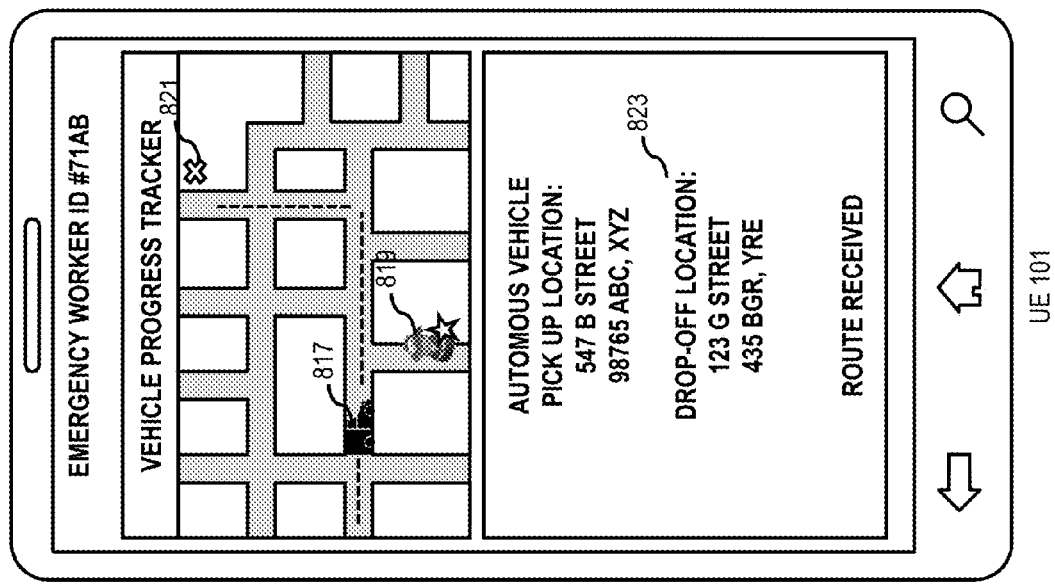

FIGS. 8A-8C are user interface diagrams that represent a scenario wherein at least one user is granted access to an autonomous vehicle, and the at least one autonomous vehicle is configured to travel to the location of an emergency situation, according to one example embodiment. In one scenario, at least one user is granted access based, at least in part, on profile information, validation of the vehicle access request, or a combination thereof. In another scenario, at least one autonomous vehicle is configured based, at least in part, on location information of at least one vehicle, location information of at least one user, location information of the emergency situation, or a combination thereof. In FIG. 8A, the configuration platform 109 upon receiving information on an emergency situation may cause a transmission of at least one notification to at least one user based, at least in part, on profile information, proximity information, or a combination thereof. The notification may be presented in the at least one UE 101 associated with the at least one user [801]. The user may provide availability information as a response to the at least one notification by clicking tab 803 if available, or tab 805 if not available. In FIG. 8B the configuration platform 109 may detect the one or more autonomous vehicles [807, 809, 811] based, at least in part, on the proximity information, the vehicle capability information, or a combination thereof [815]. In one scenario, a proximate vehicle may not be suitable for a required purpose, for example, the vehicle may not have enough fuel to reach destination 813, may not be able to reach a destination 813 (four wheel drive, winter tires, etc. required). The configuration platform 109 may determine the suitability of the at least one autonomous vehicle by processing sensor information received from the one or more sensors 105 associated with the one or more autonomous vehicles. Subsequently, in FIG. 8C the configuration platform 109 may send a request to the at least suitable autonomous vehicle for its temporary possession by the at least one user to reach at least one destination where the emergency situation has occurred [817]. The configuration platform 109 may calculate routing information from the location of the at least one autonomous vehicle [817] to the location of the at least one user [819] towards the destination where the emergency situation has occurred [821]. The configuration platform 109 may take into consideration the traffic conditions, the distance information, or a combination thereof while determining a route. In addition, the configuration platform 109 may incorporate alternative destination to get any item of interest essential for providing assistance in an emergency situation [823].

The processes described herein for granting access to an autonomous vehicle based on validation of a request, and configuring an autonomous vehicle to transport a user and/or items to at least one destination may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
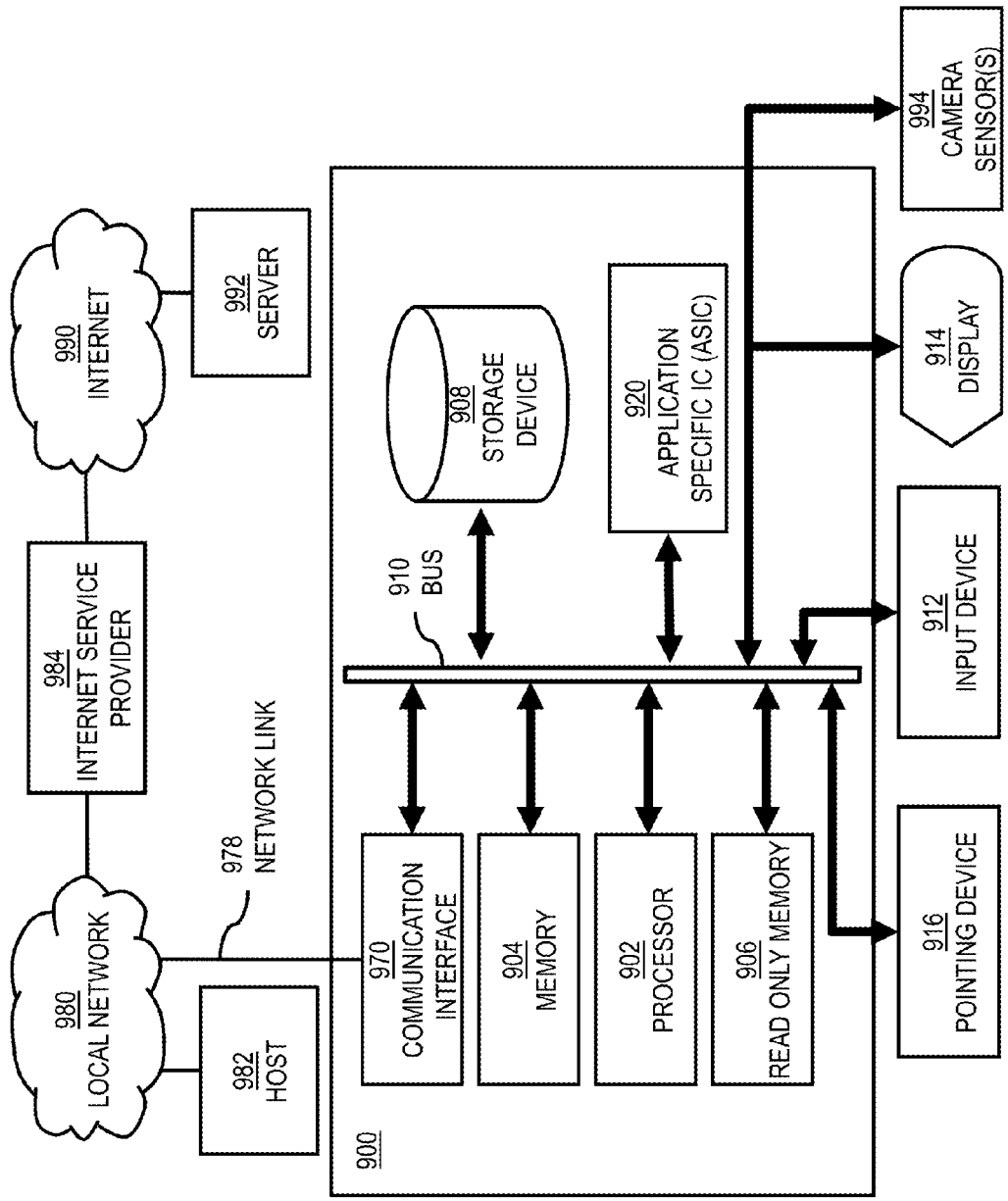
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to grant access to an autonomous vehicle based on validation of a request, and configure an autonomous vehicle to transport a user and/or items to at least one destination as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of granting access to an autonomous vehicle based on validation of a request, and configuring an autonomous vehicle to transport a user and/or items to at least one destination.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to grant access to an autonomous vehicle based on validation of a request, and configure an autonomous vehicle to transport a user and/or items to at least one destination. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 900 also includes a memory 904 coupled to bus 910. The memory 904, such as a random access memory (RAM) or any other dynamic storage device, stores information including processor instructions for granting access to an autonomous vehicle based on validation of a request, and configuring an autonomous vehicle to transport a user and/or items to at least one destination. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for granting access to an autonomous vehicle based on validation of a request, and configuring an autonomous vehicle to transport a user and/or items to at least one destination, is provided to the bus 910 for use by the processor from an external input device 912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914, and one or more camera sensors 994 for capturing, recording and causing to store one or more still and/or moving images (e.g., videos, movies, etc.) which also may comprise audio recordings. In some embodiments, for example, in embodiments in which the computer system 900 performs all functions automatically without human input, one or more of external input device 912, display device 914 and pointing device 916 may be omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 107 for granting access to an autonomous vehicle based on validation of a request, and configuring an autonomous vehicle to transport a user and/or items to at least one destination to the UE 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to grant access to an autonomous vehicle based on validation of a request, and configure an autonomous vehicle to transport a user and/or items to at least one destination as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of granting access to an autonomous vehicle based on validation of a request, and configuring an autonomous vehicle to transport a user and/or items to at least one destination.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to grant access to an autonomous vehicle based on validation of a request, and configure an autonomous vehicle to transport a user and/or items to at least one destination. The memory 1005 also stores the data associated with or generated by the execution of the inventive steps.

Figure 11:
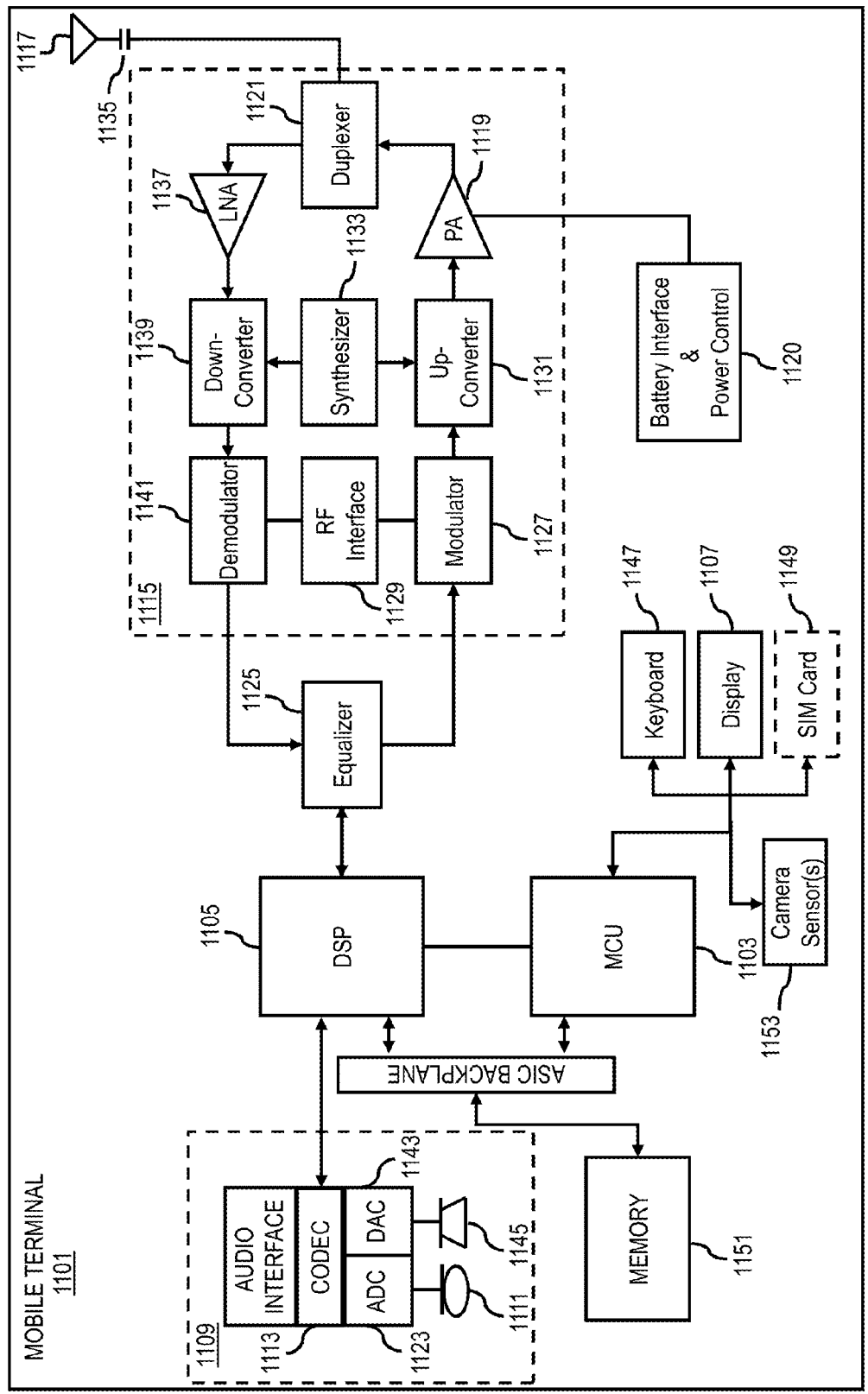
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of granting access to an autonomous vehicle based on validation of a request, and configuring an autonomous vehicle to transport a user and/or items to at least one destination. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of granting access to an autonomous vehicle based on validation of a request, and configuring an autonomous vehicle to transport a user and/or items to at least one destination. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to grant access to an autonomous vehicle based on validation of a request, and configure an autonomous vehicle to transport a user and/or items to at least one destination. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

Further, one or more camera sensors 1153 may be incorporated onto the mobile station 1101 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method of granting access to an autonomous vehicle comprising:
   receiving at an configuration server a transport request, sent over a communication network, for a transport of at least one user, at least one item, or a combination thereof to at least one destination, wherein the transport request is based on a service request for the at least one user to perform profession skills, and wherein the service request specifies one or more approved destinations, one or more approved routes, one or more approved stopovers, or a combination thereof where the profession skills associated with the at least one user are to be performed, the configuration server comprising a processor and a memory that stores profile information associated with the at least one user including the profession skills of the at least one user, stores item information associated with the profession skills, and stores the approved destinations where the profession skills are to be performed by the at least one user, wherein the processor:
   determines the profile information associated with the at least one user, information regarding the at least one item, or a combination thereof;
   validates the transport request when the at least one destination is among the approved destinations where the profession skills are to be performed by the at least one user;
   grants the access to an autonomous vehicle for the transport of the at least one user, the at least one item, or a combination thereof to the at least one destination based on the validation;
   transmits one or more command messages to the autonomous vehicle, at least one device associated with the autonomous vehicle, or a combination thereof, to configure the autonomous vehicle for initiating the transport; and
   transmits another command message to the autonomous vehicle canceling one or more current navigation instructions of the autonomous vehicle, wherein the one or more current navigation instructions are active prior to the transport request, and wherein the autonomous vehicle cancels the one or more current navigation instructions.

2. The method of claim 1, wherein the profession skills of the at least one user is associated with one or more emergency services; and wherein the at least one user, the at least one item, or a combination thereof is associated with at least one provider, at least one recipient, or a combination thereof of the one or more emergency services.

3. The method of claim 1, further comprising:
   transmitting the approved destinations, one or more approved routes to the approved destinations, one or more approved stopovers along the one or more approved routes, or a combination thereof to the autonomous vehicle to initiate the transport of the at least one user,
   wherein the at least one user is restricted from modifying the one or more approved routes during the transport of the at least one user by the autonomous vehicle.

4. The method of claim 1, further comprising:
   displaying a user interface for presenting progress information of the autonomous vehicle during the transport.

5. The method of claim 1, further comprising:
   selecting the autonomous vehicle based on contextual information associated with the at least one user, the at least one item, the at least one destination, the profession skills of the at least one user, the autonomous vehicle, a purpose of the transport, or a combination thereof.

6. The method of claim 5, wherein the contextual information associated with the autonomous vehicle include fuel availability information, vehicle configuration information, passenger capacity information, cargo capacity information, or a combination thereof.

7. The method of claim 1, further comprising:
   determining one or more locations for obtaining the at least one user, the at least one item, or a combination thereof; and
   generating at least one route to the at least destination based on specifying the one or more locations as one or more stopover locations.

8. A non-transitory computer-readable storage medium carrying one or more sequences of one or more instructions stored thereon executed by a processor to perform a method of granting access to an autonomous vehicle, the method comprising:
   storing, in a memory of a server, profile information associated with at least one user including profession skills of the at least one user, storing item information associated with the profession skills, and storing approved destinations where the profession skills are to be performed by the at least one user;
   receiving a transport request, sent over a communication network, for a transport of the at least one user, at least one item, or a combination thereof to at least one destination, wherein the transport request is based on a service request for the at least one user to perform the profession skills, and wherein the service request specifies the one or more approved destinations, one or more approved routes, one or more approved stopovers, or a combination thereof where the profession skills associated with the at least one user are to be performed;
   determining profile information associated with the at least one user, information regarding the at least one item, or a combination thereof;
   validating the transport request when the at least one destination is among the approved destinations where the profession skills are to be performed by the at least one user;
   granting the access to an autonomous vehicle for the transport of the at least one user, the at least one item, or a combination thereof to the at least one destination based on the validation;
   transmitting one or more command messages from the server to the autonomous vehicle, at least one device associated with the autonomous vehicle, or a combination thereof, to configure the autonomous vehicle for initiating the transport; and
   transmitting another command message from the server to the autonomous vehicle canceling one or more current navigation instructions of the autonomous vehicle, wherein the one or more current navigation instructions are active prior to the transport request, and wherein the autonomous vehicle cancels the one or more current navigation instructions.

9. The non-transitory computer-readable storage medium of claim 8, wherein the profession skills of the at least one user is associated with one or more emergency services; and wherein the at least one user, the at least one item, or a combination thereof is associated with at least one provider, at least one recipient, or a combination thereof of the one or more emergency services.

10. The non-transitory computer-readable storage medium of claim 8, wherein the method further comprises:
   transmitting the approved destinations, one or more approved routes to the approved destinations, one or more approved stopovers along the one or more approved routes, or a combination thereof to the autonomous vehicle to initiate the transport of the at least one user,
   wherein the at least one user is restricted from modifying the one or more approved routes during the transport of the at least one user by the autonomous vehicle.

11. The non-transitory computer-readable storage medium of claim 8, wherein the method further comprises:
   displaying a user interface for presenting progress information of the autonomous vehicle during the transport.

12. The non-transitory computer-readable storage medium of claim 8, wherein the method further comprises selecting the autonomous vehicle based on contextual information associated with the at least one user, the at least one item, the at least one destination, the profession skills of the at least one user, the autonomous vehicle, a purpose of the transport, or a combination thereof.

13. The computer-readable storage medium of claim 12, wherein the contextual information associated with the autonomous vehicle include fuel availability information, vehicle configuration information, passenger capacity information, cargo capacity information, or a combination thereof.

14. The computer-readable storage medium of claim 8, wherein the method further comprises:
   determining one or more locations for obtaining the at least one user, the at least one item, or a combination thereof; and
   generating at least one route to the at least destination based on specifying the one or more locations as one or more stopover locations.

15. The method of claim 3, further comprising:
   monitoring position information of the autonomous vehicle during transport of the at least one user; and
   redirecting the autonomous vehicle to a police station when the position information indicates an inconsistency with the one or more approved routes.

* * * * *